(12) United States Patent (10) Patent No.: US 8,366,129 B2
Salmon et al. (45) Date of Patent: Feb. 5, 2013

(54) DUAL MOTION DEPLOYABLE VEHICLE ACCESS STEP

(75) Inventors: John Salmon, North York (CA); Pasit Banjongpanith, Stouffville (CA); Dennis Loui, Richmond Hill (CA)

(73) Assignee: Multimatic Inc., Markham, Ontario (CA)

( * ) Notice: Subject to any disclaimer, the term of this patent is extended or adjusted under 35 U.S.C. 154(b) by 385 days.

(21) Appl. No.: 12/840,285

(22) Filed: Jul. 20, 2010

(65) Prior Publication Data

US 2012/0018975 A1 Jan. 26, 2012

(51) Int. Cl.
*B60R 3/02* (2006.01)

(52) U.S. Cl. .................................. 280/166; 280/163

(58) Field of Classification Search .................. 280/163, 280/164.1, 164.2, 166, 169; 296/62
See application file for complete search history.

(56) References Cited

U.S. PATENT DOCUMENTS

| 6,685,204 | B1 * | 2/2004 | Hehr | 280/166 |
| 2004/0150184 | A1 * | 8/2004 | Bang et al. | 280/166 |
| 2009/0014978 | A1 * | 1/2009 | Shumway | 280/166 |

* cited by examiner

*Primary Examiner* — Hau Phan
*Assistant Examiner* — Bryan Evans
(74) *Attorney, Agent, or Firm* — Gigette M. Bejin (57) ABSTRACT

A dual motion vehicle access step that can be deployed by initially rotating it around a pivot joint in response to an operator pushing down on the step to overcome a closing torque and then translating the step away from the vehicle in response to a biasing force. Both of the closing torque and biasing force are provided by a single energy storage device. An interlocking latch is configured to selectively structurally lock-out either the rotating motion or translating motion on an alternating basis.

9 Claims, 10 Drawing Sheets

DUAL MOTION DEPLOYABLE VEHICLE ACCESS STEP

BACKGROUND

The present disclosure relates to automotive vehicle access steps, including a dual action deployable access step for pickup trucks and sport utility vehicles.

In the use of automotive vehicles, and particularly those with high ground clearance such as pickup trucks and sport utility vehicles, it is often desired to gain access to elevated areas such as the cargo bed or roof rack. Various configurations of fixed and retractable steps exist which offer a number of different methods to gain access to these areas of the vehicle. However, in all cases these steps are limited by either a compromised fixed location or limited motion envelope dictated by the employed linkage or package constraints.

It would therefore be desirable to provide a deployable vehicle access step that combines both rotary and linear motions so as to afford a large and flexible deployment envelope. It would be a further enhancement if the linear and rotary mechanisms were interlocked so as to allow only selective single degree of freedom motion. Finally, a highly adaptable and efficient access step would result if an energy storage device is incorporated that imparts a torque to the rotary mechanism biasing the step towards the retracted state while also applying a force on the linear mechanism that biases the step towards a deployed state when commanded by the user.

Accordingly, the present disclosure provides a dual motion vehicle access step that can be deployed by initially rotating it around a pivot joint in response to an operator pushing down on the step to overcome a closing torque and then translating it away from the vehicle in response to a biasing force. Both of the closing torque and biasing force are provided by a single energy storage device. The combination of the rotary downward motion and linear outward motion results in the step being capable of a deployment envelope far larger than any results in the step being capable of a deployment envelope far larger than any of the existing prior art configurations.

The dual motion vehicle access step of the present invention includes a step component, a body component and a mounting bracket adapted to be rigidly attached to a vehicle. The step component incorporates a step suitable for providing a safe and convenient means of accessing elevated areas of the vehicle. The body component is configured with a rotary joint at its inboard end that is anchored to the mounting bracket allowing a single rotary degree of freedom of the body component relative to the mounting bracket. The body component further incorporates a linear motion control element adapted to constrain the step component movement to a single degree of freedom translation relative to the body component while being capable of transferring the operational step loads between the components. The body component additionally includes an interlocking latch assembly that is configured to selectively limit operation of the deployable vehicle access step to either the linear translation of the step component relative to the body component or the rotary motion of the body component relative to the mounting bracket.

The dual motion vehicle access step of the present invention includes a step component, a body component and a mounting bracket adapted to be rigidly attached to a vehicle. The step component incorporates a step suitable for providing a safe and convenient means of accessing elevated areas of the vehicle. The body component is configured with a rotary joint at its inboard end that is anchored to the mounting bracket allowing a single rotary degree of freedom of the body component relative to the mounting bracket. The body component further incorporates a linear motion control element adapted to constrain the step component movement to a single degree of freedom translation relative to the body component while being capable of transferring the operational step loads between the components. The body component additionally includes an interlocking latch assembly that is configured to selectively limit operation of the deployable vehicle access step to either the linear translation of the step component relative to the body component or the rotary motion of the body component relative to the mounting bracket.

In a further aspect of the present disclosure the dual motion vehicle access step incorporates an energy storage device adapted to impart both a torque to bias the body component into a retracted state and a force to bias the step component into a deployed state. In this manner when an operator pushes downwards on the retracted step the body component rotates to an intermediate deployed state against the biasing torque of the energy storage device and causes the interlocking latch assembly to lock the rotary joint and release the step component so that the force produced by the energy storage device then biases the step component to translate to a fully deployed position. Additionally, when an operator pushes inwardly on the fully deployed step component it translates to its retracted state against the biasing force of the energy storage device and causes the interlocking latch assembly to lock the step component and release the body component so that the torque produced by the energy storage device then biases the step component to rotate to a fully retracted state.

In a preferred embodiment of the present disclosure the interlocking latch consists of a body component ratchet, a step component ratchet, a switching pawl and a biasing plunger configured to retain the switching pawl in one of two latching states. Additionally, the body component is configured with a body component striker adapted to interact with the body component ratchet to create a structural lock and the step component is configured with a step component striker adapted to interact with the step component ratchet to create a structural lock. The switching pawl selectively retains either the step component ratchet in a locked position or the body component ratchet in a locked condition via the biasing plunger, dependent on operator input. When the vehicle access step is fully retracted the energy storage device imparts a biasing torque on the body component holding it in this state and the interlocking latch is arranged so that the switching pawl prescribes that the step component ratchet and step component striker are structurally locked and the body component striker is fully released from the body component ratchet. In this manner when an operator pushes downwards on the retracted step the body component is free to rotate to an intermediate deployed state against the biasing torque of the energy storage device but the step component cannot translate as it is structurally locked to the body component. When the vehicle access step reaches the intermediate deployed state the body component striker contacts the body component ratchet and rotates it causing the switching pawl to overcome the biasing plunger force and change states from retaining the step component ratchet to retaining the body component ratchet. The step component ratchet is therefore released and the force produced by the energy storage device biases the step component to translate to a fully deployed position. Additionally, when an operator pushes inwardly on the fully deployed step component it is free to translate to its retracted state against the biasing force of the energy storage device but the body component cannot rotate as it is structurally locked to the mounting bracket. When the step component reaches its retracted state the step component striker contacts the step component ratchet and rotates it causing the switching pawl to overcome the biasing plunger force and change states from retaining the body component ratchet to retaining the step component ratchet. The body component ratchet is therefore released and the torque produced by the energy storage device then biases the step component to rotate to a fully retracted state.

In a further preferred embodiment of the dual motion vehicle access step of the present disclosure a load link is provided which is pivotally attached to the mounting bracket and integrates the body component striker and a rotary attachment point adapted to retain the inboard end of a linear energy storage device. Additionally a motion control link is configured to pivotally attach to the load link at one end and the body component at the other. The mechanism created by the motion control link and load link allows the force generated by the linear energy storage device to be imparted as a torque on the body component and provides a varying and advantageous leverage ratio for the energy storage device so that the closing assist torque remains relatively constant through the body component's entire range of rotary motion. Additionally the mechanism is configured so as to provide a fixed rotation point for the inboard end of the energy storage device when the body component striker is structurally locked by the body component ratchet.

In an alternative embodiment of the present disclosure the interlocking latch incorporates a pair of torsion springs with their wound axis coaxially aligned with the pivot joints of the ratchets so as to bias the ratchets into an unlocked state.

In a preferred embodiment of the present disclosure the energy storage device is a gas spring.

In an alternative embodiment of the present disclosure the energy storage device is a coil spring, elastomeric spring or similar means.

Further aspects of the disclosure will become apparent from the following description.

DETAILED DESCRIPTION

Figure 1:
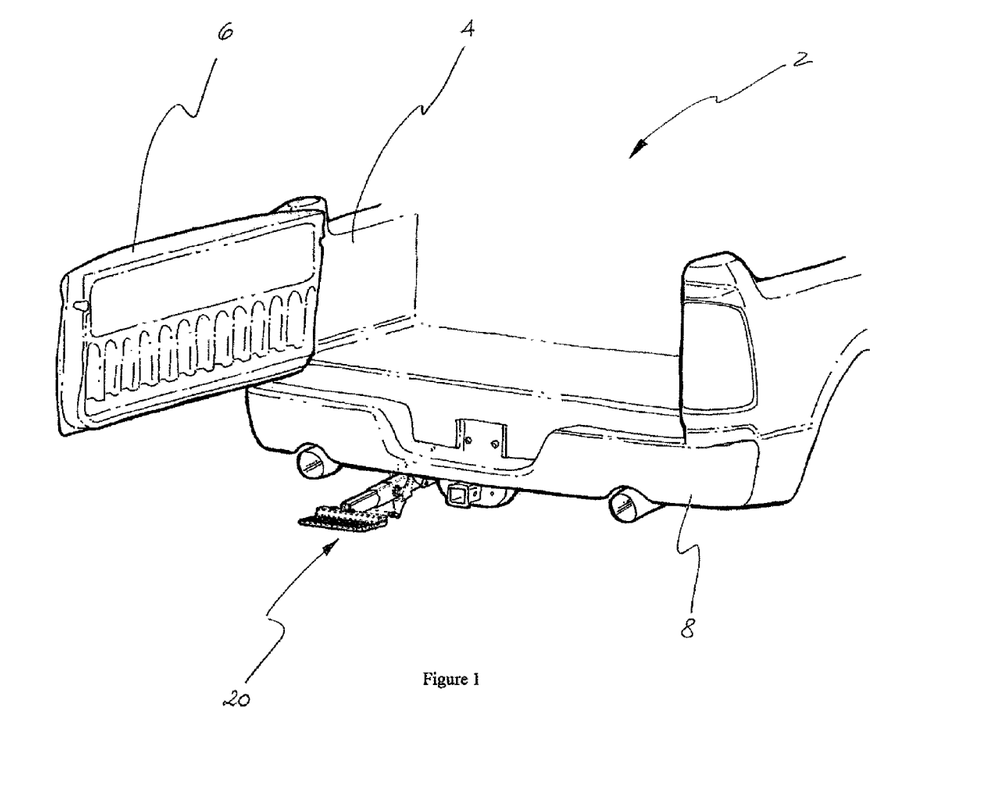
FIG. 1 is a partial perspective view of a typical pick-up truck with the inventive dual motion deployable vehicle access step shown in its fully deployed position.

FIG. 1 illustrates a pick-up truck (2) having a cargo box (4) whose rear opening is closable via a pivotally mounted tailgate (6). The tailgate (6) is side pivoted and shown in the fully open position. A dual motion deployable vehicle access step (20) is mounted beneath the pick-up truck's rear bumper (8) and is shown in a fully deployed state.

Figure 2:
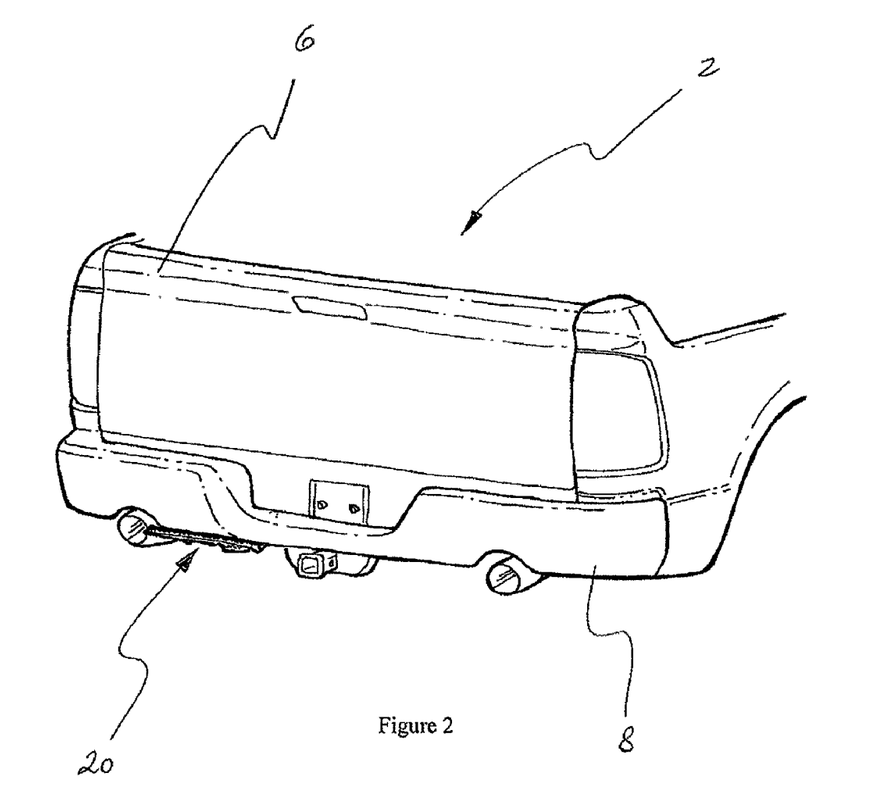
FIG. 2 is a partial perspective view of a typical pick-up truck with the inventive dual motion deployable vehicle access step shown in its fully retracted position.

FIG. 2 illustrates the pick-up truck (2) with the tailgate (6) shown in a closed position and the dual motion deployable vehicle access step (20) in a fully retracted state below the rear bumper (8).

Figure 3:
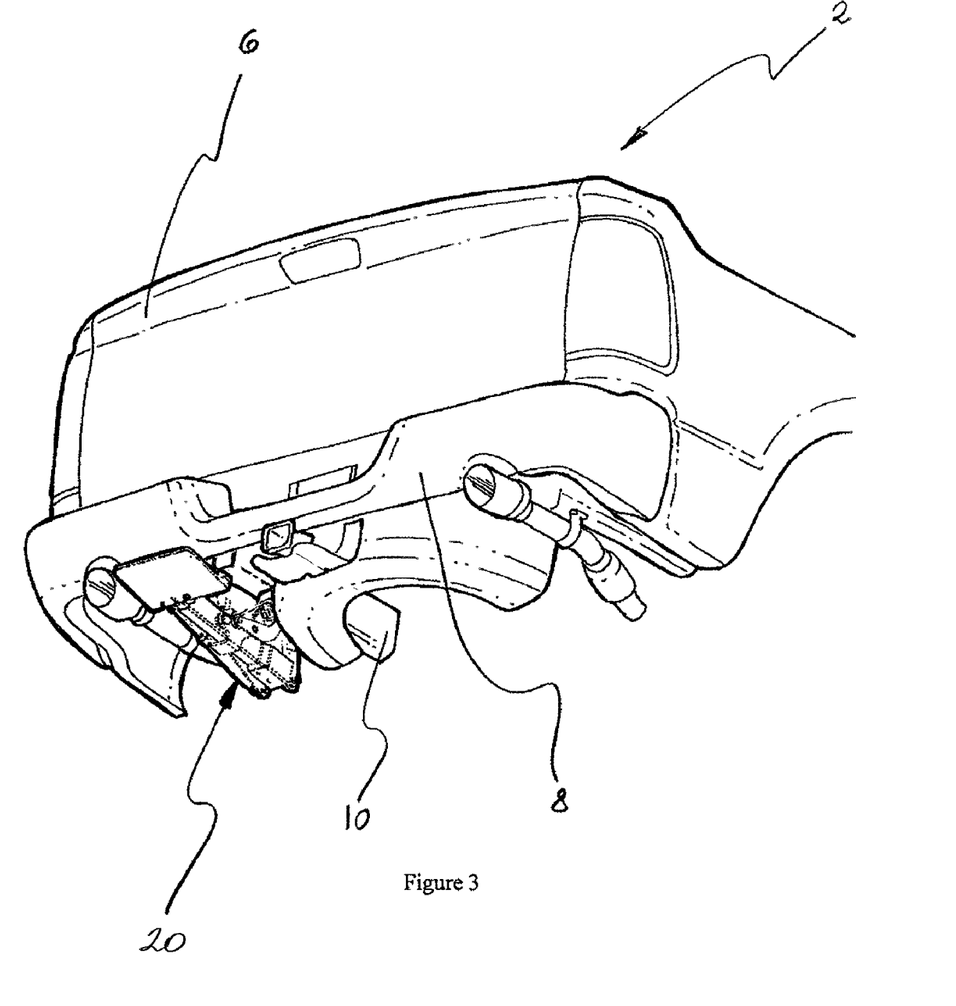
FIG. 3 is a partial perspective view of a typical pick-up truck from below with the inventive dual motion deployable vehicle access step shown in its fully retracted position.

FIG. 3 illustrates a view of the pick-up truck (2) from beneath with the tailgate (6) shown in a closed position and the dual motion deployable vehicle access step (20) in a fully retracted state below the rear bumper (8). The deployable vehicle access step (20) is mounted rigidly to the main structure (10) of the pick-up truck (2).

Figure 4:
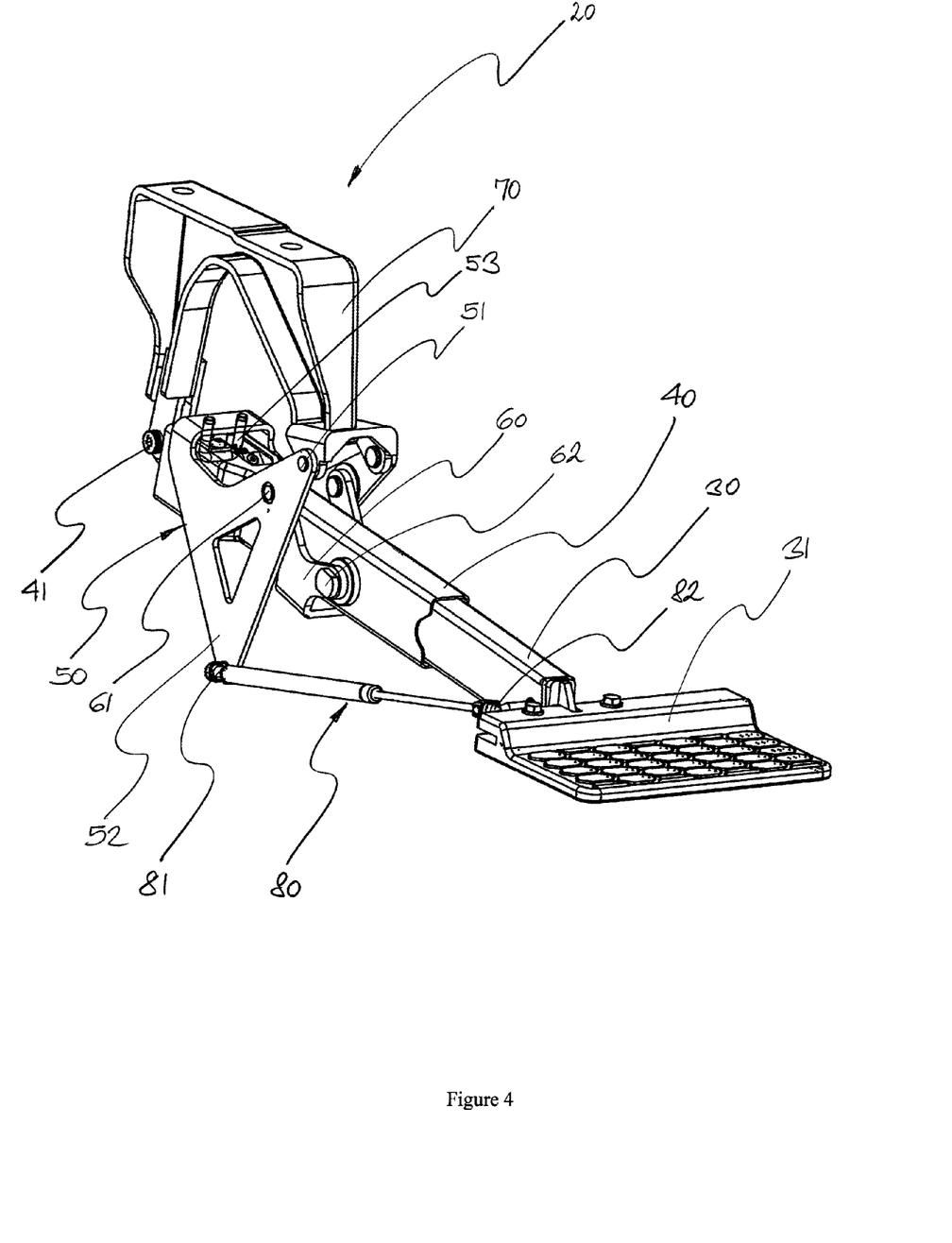
FIG. 4 is a perspective view of the inventive dual motion deployable vehicle access step shown in its fully deployed position.

FIG. 4 illustrates the dual motion deployable vehicle access step (20) in isolation. The deployable vehicle access step (20) is shown in a fully deployed state and includes a step component (30), a body component (40), a load link (50), a motion control link (60) and a mounting bracket (70) adapted to be rigidly attached to the main structure of the pick-up truck. The step component (30) incorporates a step (31) suitable for providing a safe and convenient means of accessing elevated areas of the vehicle. The body component (40) is configured with a rotary joint (41) at its inboard end that is anchored to the mounting bracket (70) allowing a single rotary degree of freedom of the body component (40) relative to the mounting bracket (70). The load link (50) is rotatably connected to the mounting bracket (70) via a pivot joint (51) and is configured with an actuation arm (52). The load link (50) is further adapted to structurally attach a body component striker (53). Additionally, a gas spring (80) is rotatably mounted to the actuation arm (52) of the load link (50) via an inboard pivot joint (81) at its inboard end and rotatably mounted to the step component (30) via an outboard pivot joint (82) at its outboard end. The motion control link (60) is rotatably connected to the load link (50) via a first control joint (61) and is rotatably connected to the body component (40) at a second control joint (62). The mechanism created by the motion control link (60) and load link (50) allows the force generated by the gas spring (80) to be imparted as a torque on the body component (40).

Figure 5:
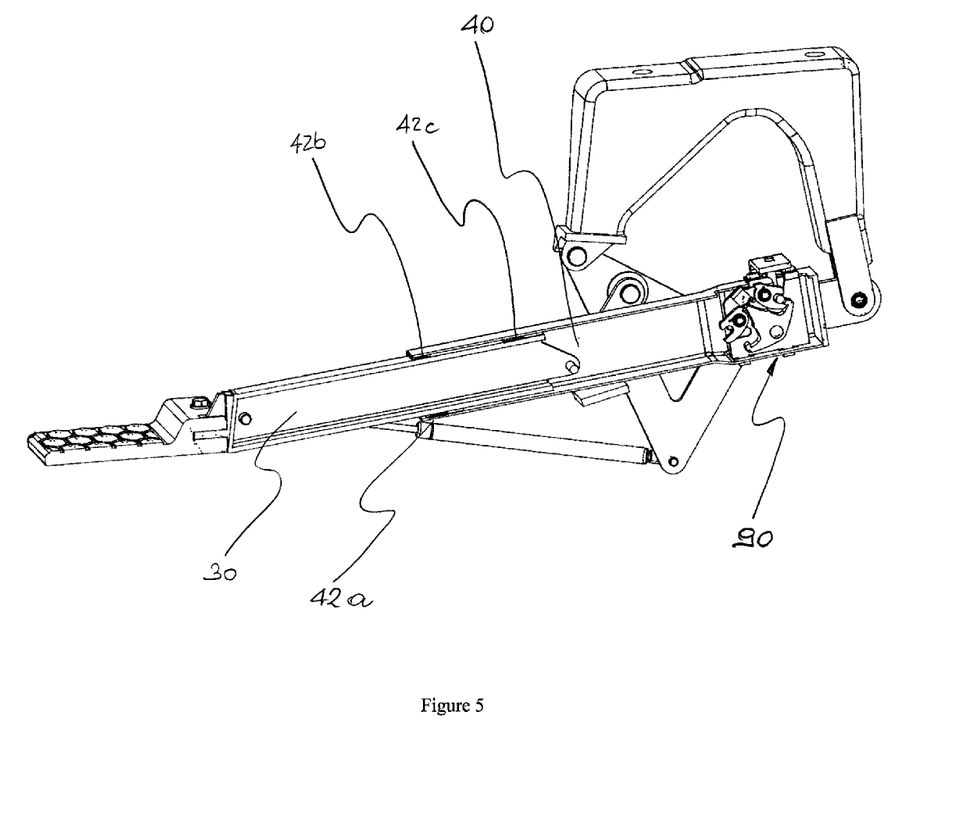
FIG. 5 is a sectional perspective view of the inventive dual motion deployable vehicle access step shown in its fully deployed position.

Referring to FIG. 5, the body component (40) incorporates a linear motion control element (42) adapted to constrain the movement of the step component (30) to a single degree of freedom translation along the longitudinal axis of the body component (40). The linear motion control element (42) is configured from three bearing pads (42a) (42b) (42c) which are adapted to transfer the operational step loads between the step component (30) and body component (40). The body component (40) also incorporates an interlocking latch (90) within its structure.

Figure 6:
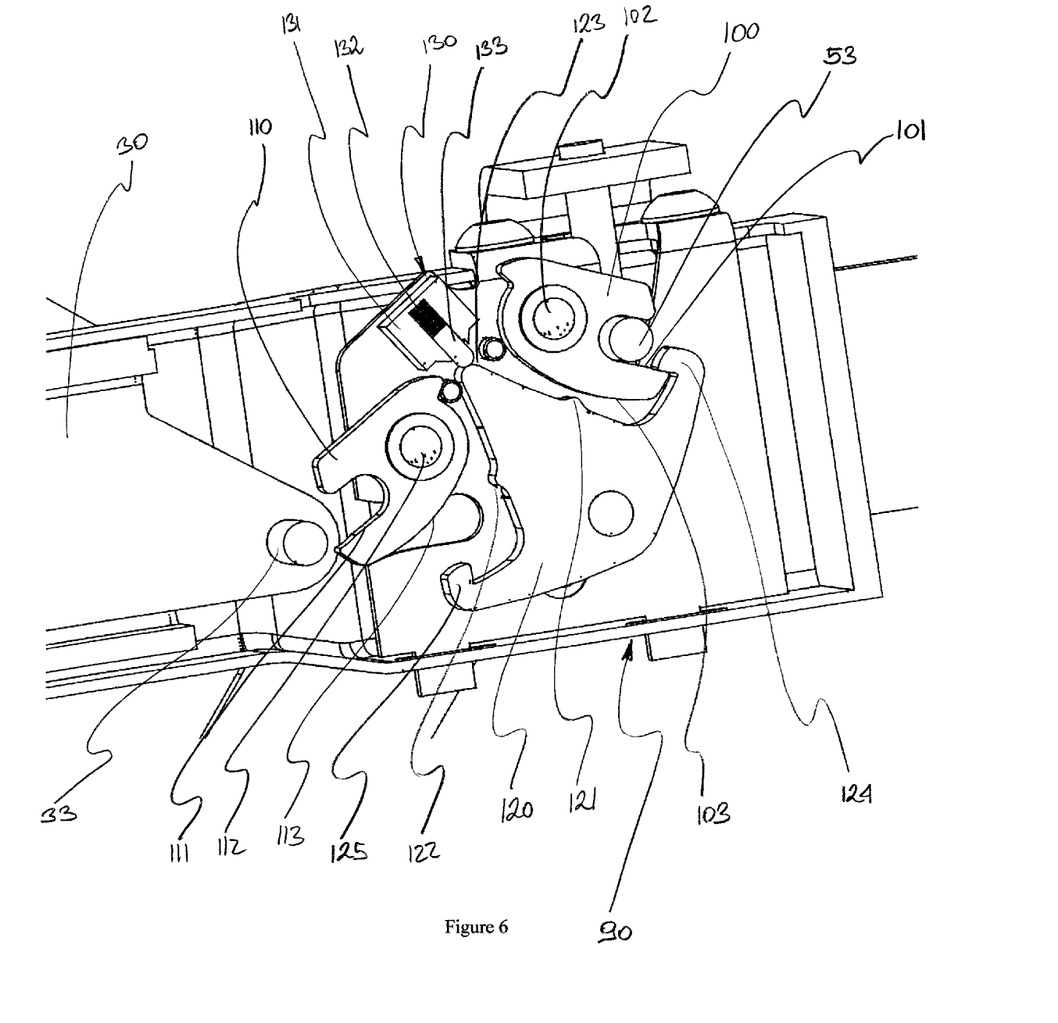
FIG. 6 is a partial sectional perspective view of the inventive dual motion deployable vehicle access step in an intermediate state specifically showing the interlocking latch.

FIG. 6 illustrates the details of the interlocking latch (90) which includes a body component ratchet (100), a step component ratchet (110), a switching pawl (120) and a biasing plunger assembly (130). The biasing plunger assembly (130) includes a housing (131), a biasing spring (132) and a biasing plunger (133) held in a normally extended state by the biasing spring (132). The body component ratchet (100) is configured with a retention throat (101), a pivot joint (102) and a cam surface (103). The step component ratchet (110) is configured with a retention throat (111), a pivot joint (112) and a cam surface (113). Additionally the step component (30) is configured with a step component striker (33) adapted to interact with the retention throat (111) of the step component ratchet (110) so as to create a structural lock and the body component striker (53) is adapted to interact with the retention throat (101) of the body component ratchet (100) so as to create a structural lock. The switching pawl (120) is configured with a body switching follower (121), a step switching follower (122), a retention feature (123), a body component ratchet hook (124) and a step component ratchet hook (125). The body switching follower (121) is configured to interact with the cam surface (103) of the body component ratchet (100) when the body component striker (53) comes into contact with the retention throat (101) and rotates the body component ratchet (100) around its pivot joint (102). The interaction of the cam surface (103) upon the body switching follower (121) rotates the switching pawl (120) so that the retention feature (123) overcomes the force of the biasing plunger (133) which causes the body component ratchet hook (124) to come into contact with the retention throat (101) and structurally lock the body component ratchet (100) and body component striker (53) while simultaneously releasing the retention throat (111) of the step component ratchet (110) from the step component ratchet hook (125) so that the step component striker (33) is unlocked. Conversely the step switching follower (122) is configured to interact with the cam surface (113) of the step component ratchet (110) when the step component striker (33) comes into contact with the retention throat (111) and rotates the step component ratchet (110) around its pivot joint (112). The interaction of the cam surface (113) upon the step switching follower (122) rotates the switching pawl (120) so that the retention feature (123) overcomes the force of the biasing plunger (133) which causes the step component ratchet hook (125) to come into contact with the retention throat (111) and structurally lock the step component ratchet (110) and step component striker (33) while simultaneously releasing the retention throat (101) of the body component ratchet (100) from the body component ratchet hook (124) so that the body component striker (53) is unlocked. In this way the switching pawl (120) allows the ratchets (100) (110) to selectively structurally lock the strikers (33) (53) on an alternating basis.

Figure 7:
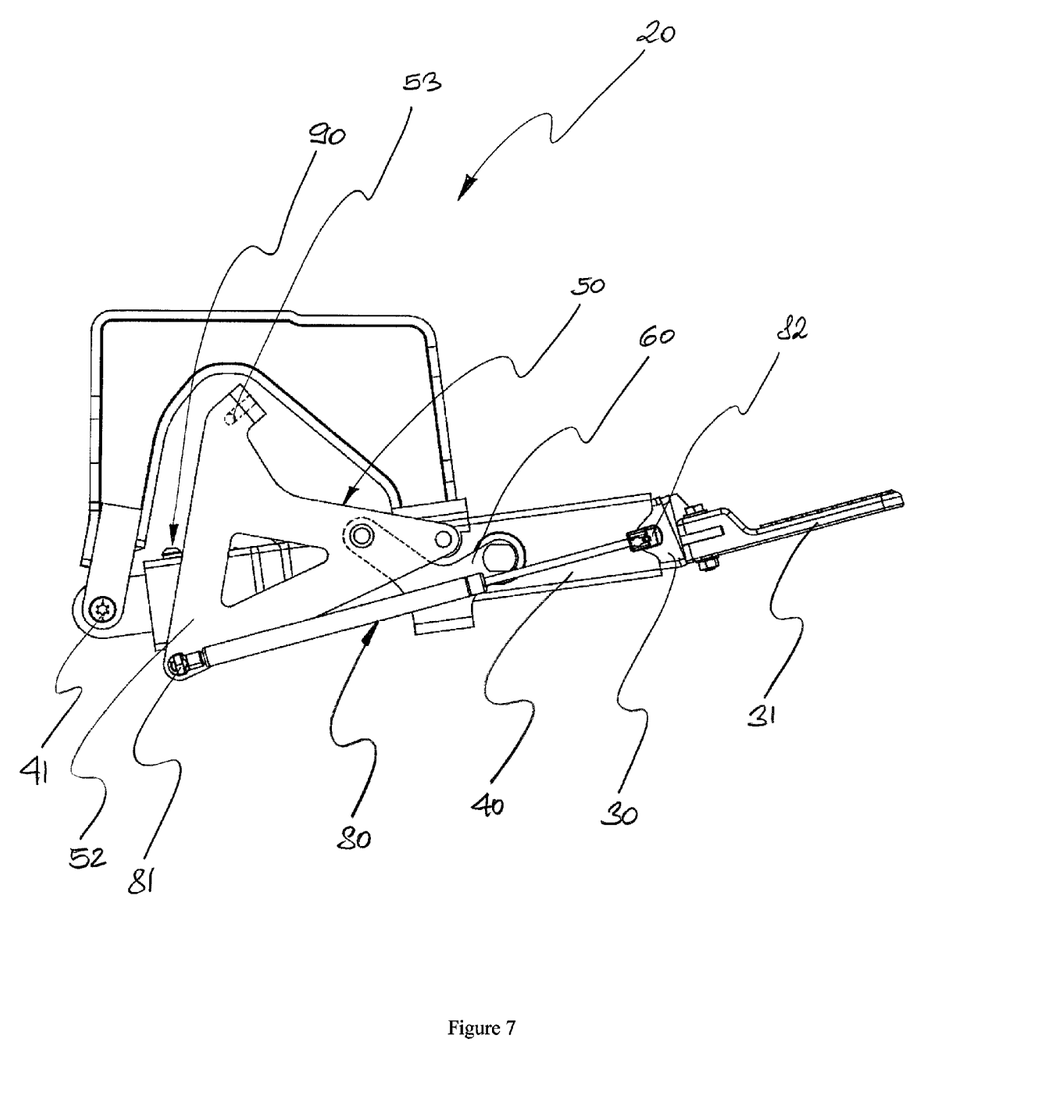
FIG. 7 is a side view of the inventive dual motion deployable vehicle access step shown in its fully retracted position.

FIG. 7 illustrates the dual motion deployable vehicle access step (20) in isolation and in its fully retracted state with the body component striker (53) released from the interlocking latch (90) and the load link (50) rotated to its fully released extent by the motion control link (60). In this state the body component (40) is free to rotate around its rotary joint (41) and the step component (30) is structurally locked by the interlocking latch (90). The orientation of the actuation arm (52) of the load link (50) dictates the relationship of the inboard pivot joint (81) to the outboard pivot joint (82) of the gas spring (80) such that a closing assist biasing torque is applied to the body component (40) around its rotary joint (41) via the mechanism created by the motion control link (60) and load link (50). In this manner the biasing torque retains the dual motion deployable vehicle access step in its fully retracted state.

Figure 8:
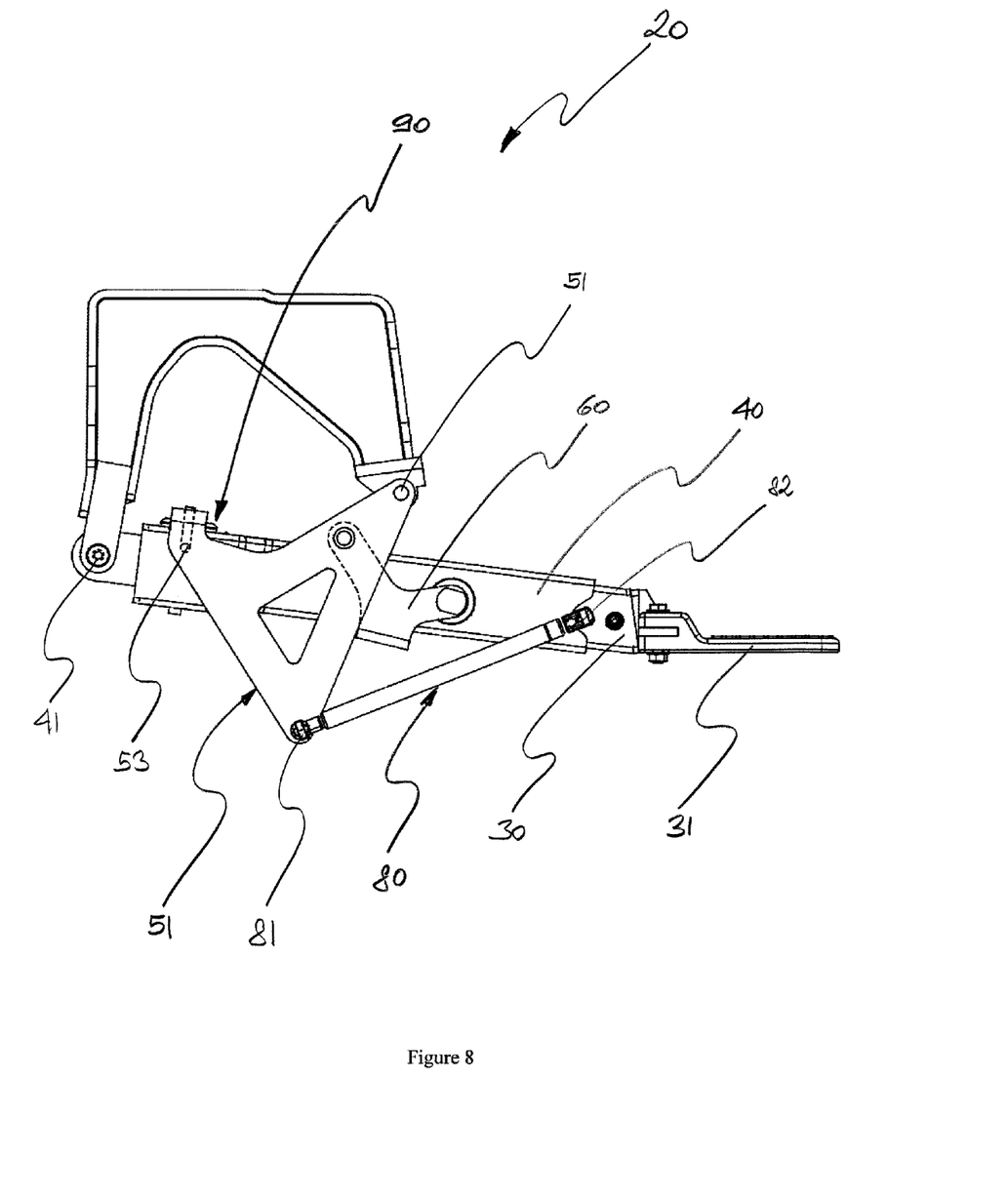
FIG. 8 is a side view of the inventive dual motion deployable vehicle access step shown in an intermediate state.
Figure 9:
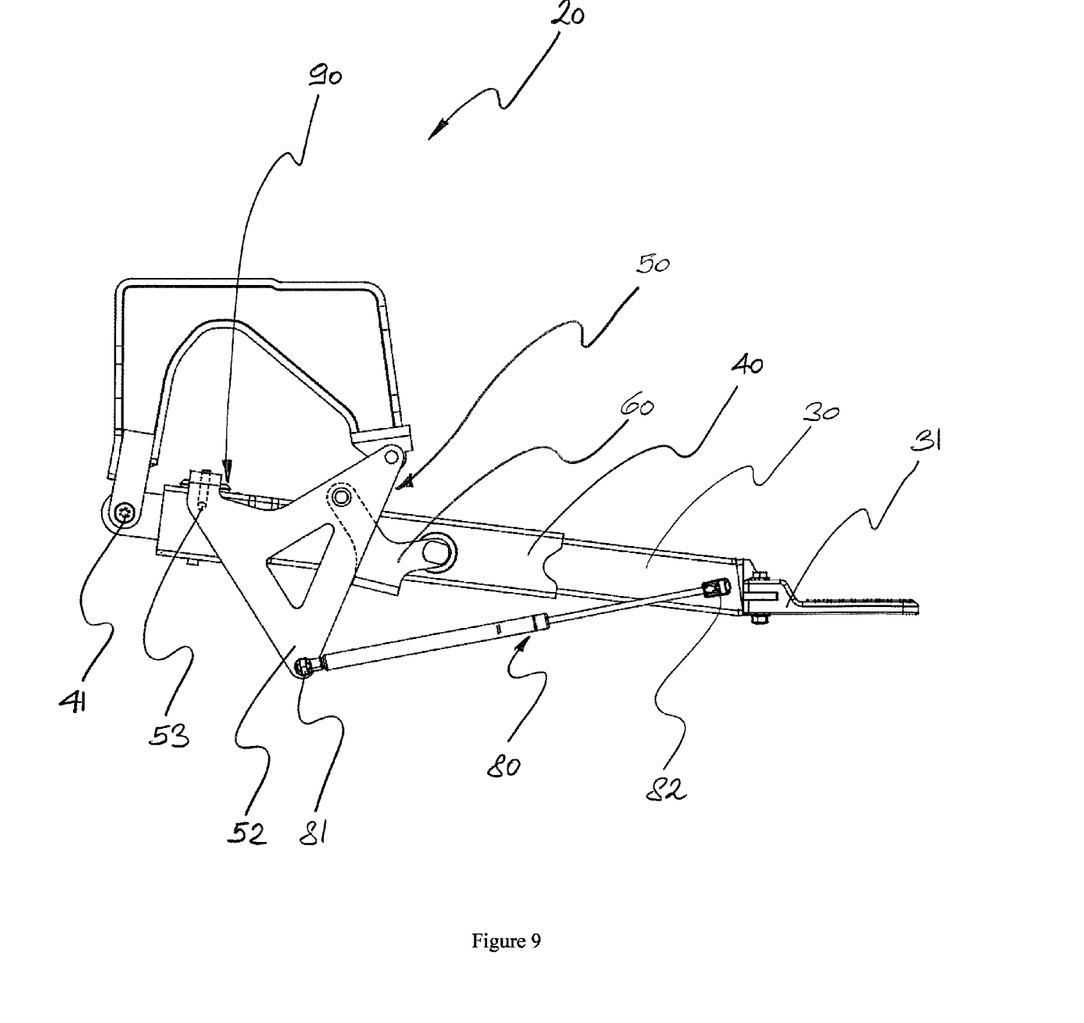
FIG. 9 is a side view of the inventive dual motion deployable vehicle access step shown in its fully deployed position.

Referring to FIGS. 7, 8 and 9, when an operator pushes downwards on the step (31) of the structurally locked step component (30) when the dual motion deployable vehicle access step is in its fully retracted state, as shown in FIG. 7, the body component (40) rotates around its rotary joint (41) to an intermediate deployed state, as shown in FIG. 8, against the biasing torque of the gas spring (80). The rotation of the body component (40) around its rotary joint (41) causes the motion control link (60) to rotate the load link (50) around its pivot joint (51) and engage the body component striker (53) in the interlocking latch (90) which in turn structurally locks the body component (40) and releases the step component (30). In this intermediate deployed state the inboard pivot joint (81) and outboard pivot joint (82) of the gas spring (80) are oriented so that the force produced by the gas spring (80) biases the released step component (30) to translate to a fully deployed position as shown in FIG. 9.

FIG. 9 illustrates the dual motion deployable vehicle access step (20) in isolation and in its fully deployed state with the load link (50) rotated to its fully engaged extent by the motion control link (60) and the body component striker (53) fully engaged in the interlocking latch (90). In this state the step component (30) is free to translate and the body component (40) is structurally locked by the interlocking latch (90) and so is therefore prevented from rotating around its rotary joint (41). The orientation of the actuation arm (52) of the load link (50) dictates the relationship of the inboard pivot joint (81) to the outboard pivot joint (82) of the gas spring (80) such that an opening assist biasing force is applied to the step component (30). In this manner the biasing force retains the dual motion deployable vehicle access step in its fully deployed state.

Referring to FIGS. 7, 8 and 9, when an operator pushes inwardly on the step (31) of the step component (30) when the dual motion deployable vehicle access step is in its fully deployed state, as shown in FIG. 9, the step component (30) is free to translate to its retracted state against the biasing force of the gas spring (80) but the body component (40) cannot rotate as it is structurally locked by the interlocking latch (90) and this results in an intermediate deployed state, as shown in FIG. 8. When the step component (30) reaches is retracted state the interlocking latch (90) structurally locks the step component (30) and releases the body component striker (53) so that the body component (40) is free to rotate around its rotary joint (41). In this intermediate deployed state the inboard pivot joint (81) and outboard pivot joint (82) of the gas spring (80) are oriented so that the biasing torque produced by the gas spring (80) via the mechanism created by the motion control link (60) and load link (50) rotates the released body component (40) to a fully retracted position as shown in FIG. 7.

Figure 10:
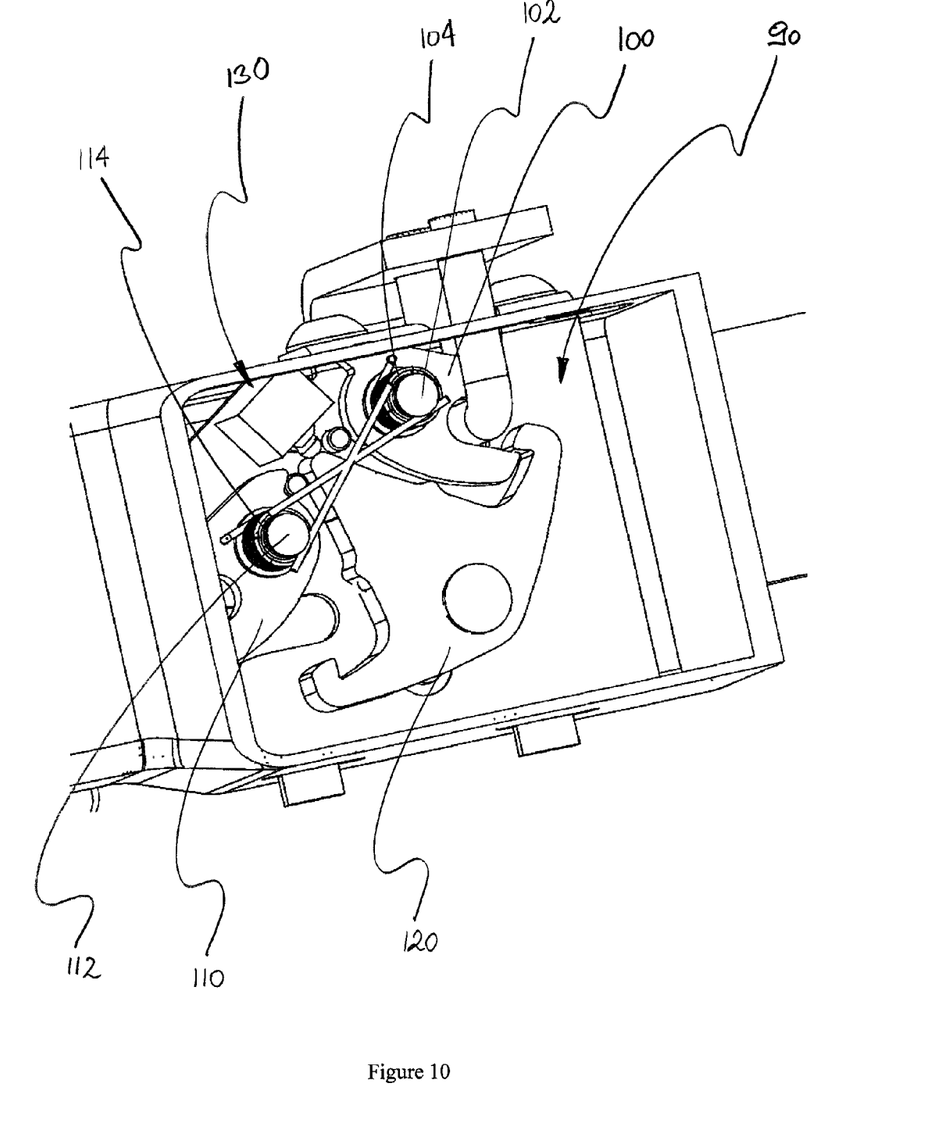
FIG. 10 is a partial sectional perspective view of the inventive dual motion deployable vehicle access step in an intermediate state specifically showing an alternative embodiment of the interlocking latch.

FIG. 10 illustrates the details of an alternative embodiment of the interlocking latch (90) which includes a body component ratchet (100), a step component ratchet (110), a switching pawl (120) and a biasing plunger assembly (130). A body component ratchet spring (104) is incorporated with its wound axis coaxially aligned with the pivot joint (102) of the body component ratchet (100). A step component ratchet spring (114) is incorporated with its wound axis coaxially aligned with the pivot joint (112) of the step component ratchet (110). These ratchet springs (104) (114) are configured to impart a torque on the ratchets (100) (110) so as to bias them into a normally unlocked state.

What is claimed is:

1. A dual motion deployable vehicle access step including:
a step component;
a body component including a linear motion control element, a rotary joint, and an interlocking latch assembly;
a mounting bracket adapted to be rigidly attached to a vehicle and operatively configured to anchor the rotary joint of the body component to the vehicle;
the step component operatively configured to translate relative to the body component in constraint of said linear motion control element;
said interlocking latch assembly being operatively configured to selectively limit operation of the deployable vehicle access step to one of an either linear motion of the step component relative to the body component or a rotary motion of the body component relative to the mounting bracket;

an energy storage device adapted to impart both a torque to bias the body component into a retracted state and a force to bias the step component into a deployed state;

such that when an operator pushes downwards on the retracted step the body component rotates to an intermediate deployed state against the biasing torque of the energy storage device and causes the interlocking latch assembly to lock the body component and release the step component so that the force produced by the energy storage device then biases the step component to translate to a fully deployed position.

2. The dual motion deployable vehicle access step of claim 1, wherein the interlocking latch further comprises:

a body component ratchet having a body retention throat, a body pivot joint and a body cam surface; a step component ratchet having a step retention throat, a step pivot joint and a step cam surface;

a switching pawl having a body switching follower, a step switching follower, a retention feature, a body component ratchet hook and a step component ratchet hook; a biasing plunger operatively configured to retain the switching pawl in one of two latching states; such that the body component of the dual motion deployable vehicle access step is configured with a body component striker adapted to interact with the body retention throat to create a structural lock, and the step component of the dual motion deployable vehicle access step is configured with a step component striker adapted to interact with the step retention throat to create a structural lock and the switching pawl selectively retains either the step component ratchet in a locked position or the body component ratchet in a locked condition via the biasing plunger dependent on operator input.

3. The dual motion deployable vehicle access step as defined in claim 2 further comprising a load link rotatably attached to the mounting bracket, the load link incorporates a rotary attachment point adapted to retain an inboard end of the energy storage device so as to dictate a varying and advantageous leverage ratio for the energy storage device.

4. The dual motion deployable vehicle access step as defined in claim 3, wherein the load link motion is dictated by a motion control link that is pivotally attached to the load link at a first end and is pivotally attached to the body component at a second end so that the control link and load link apply a torque to the body component to bias the body component into a retracted state and a force to the step component to bias the step component into a deployed state.

5. The dual motion deployable vehicle access step as defined in claim 4 wherein the body component striker is affixed to the load link so that the body component's interaction with the step component ratchet can be directly coupled to the motion of the load link as dictated by the motion control link.

6. The dual motion deployable vehicle access step as defined in claim 1 wherein the linear motion control element of the body component is comprised of three bearing pads operatively configured to transfer the operational step loads between the step component and the body component.

7. The dual motion deployable vehicle access step as defined in claim 1 wherein the energy storage device is a gas spring.

8. The dual motion deployable vehicle access step as defined in claim 1 wherein the energy storage device is one of a coil spring or a elastomeric spring.

9. The dual motion deployable vehicle access step as defined in claim 2 wherein the interlocking latch includes a pair of torsion springs adapted to bias the ratchets into an unlocked state.

* * * * *